United States Patent [19]  
Donn et al.

[11] Patent Number: 4,651,585  
[45] Date of Patent: Mar. 24, 1987

[54] STEERING BOX FOR A MOTOR VEHICLE

[75] Inventors: Vittorio Donn; Pietro Cogno, both of Turin, Italy

[73] Assignee: RIV-SKF Officine Di Villar Perosa S.p.A., Turin, Italy

[21] Appl. No.: 677,493

[22] Filed: Dec. 3, 1984

[51] Int. Cl.⁴ .......................... F16H 1/04; B62D 1/20
[52] U.S. Cl. .......................................... 74/422; 74/498
[58] Field of Search ........................ 74/498, 422, 409; 180/79, 132, 148, 151, 160; 308/6 R

[56] References Cited

U.S. PATENT DOCUMENTS

| | | | |
|---|---|---|---|
| 4,019,784 | 4/1977 | Ladin et al. | 308/6 R |
| 4,215,591 | 8/1980 | Bishop | 74/498 |
| 4,271,716 | 6/1981 | Carduner | 74/422 |
| 4,322,986 | 4/1982 | Adams et al. | 74/422 |
| 4,337,781 | 7/1982 | Brundago | 308/6 R |
| 4,429,922 | 2/1984 | Pfluger | 308/6 R |
| 4,448,088 | 5/1984 | Adams | 74/498 |
| 4,531,603 | 7/1985 | Van Cise Jr. | 74/498 |

Primary Examiner—Lawrence Staab  
Attorney, Agent, or Firm—Frost & Jacobs

[57] ABSTRACT

A steering box for a motor vehicle comprises a rotatable toothed pinion, an axially movable rack within a casing, and a support unit to support the thrust which the pinion applies to the rack during operation. The support unit comprises a rotatable roller operable to support the rack. The roller is provided with an axial hold in which is formed a pair of rolling tracks for rolling bodies. A pair of rings are disposed within the hole in contact with one another, each forming with the roller the rolling tracks for the rolling bodies. Two rings of the rolling bodies are disposed between the roller and the rings. A pin supports the rings. The pin is mounted in a cylindrical body provided with a central cavity operable to house the roller, at least patially. The cylindrical body is provided with a pair of slots each of which is able to receive one end of the pin.

6 Claims, 6 Drawing Figures

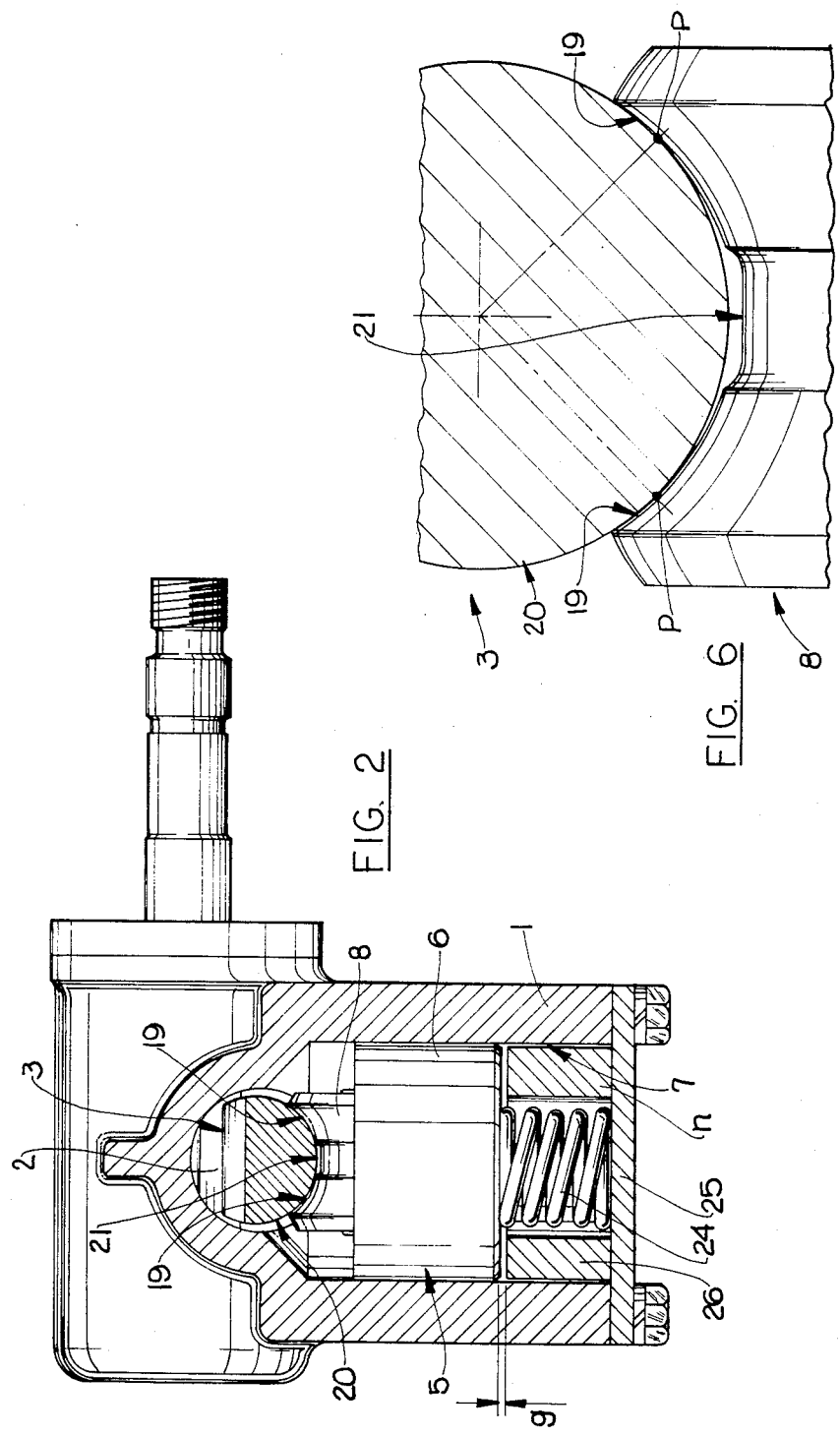

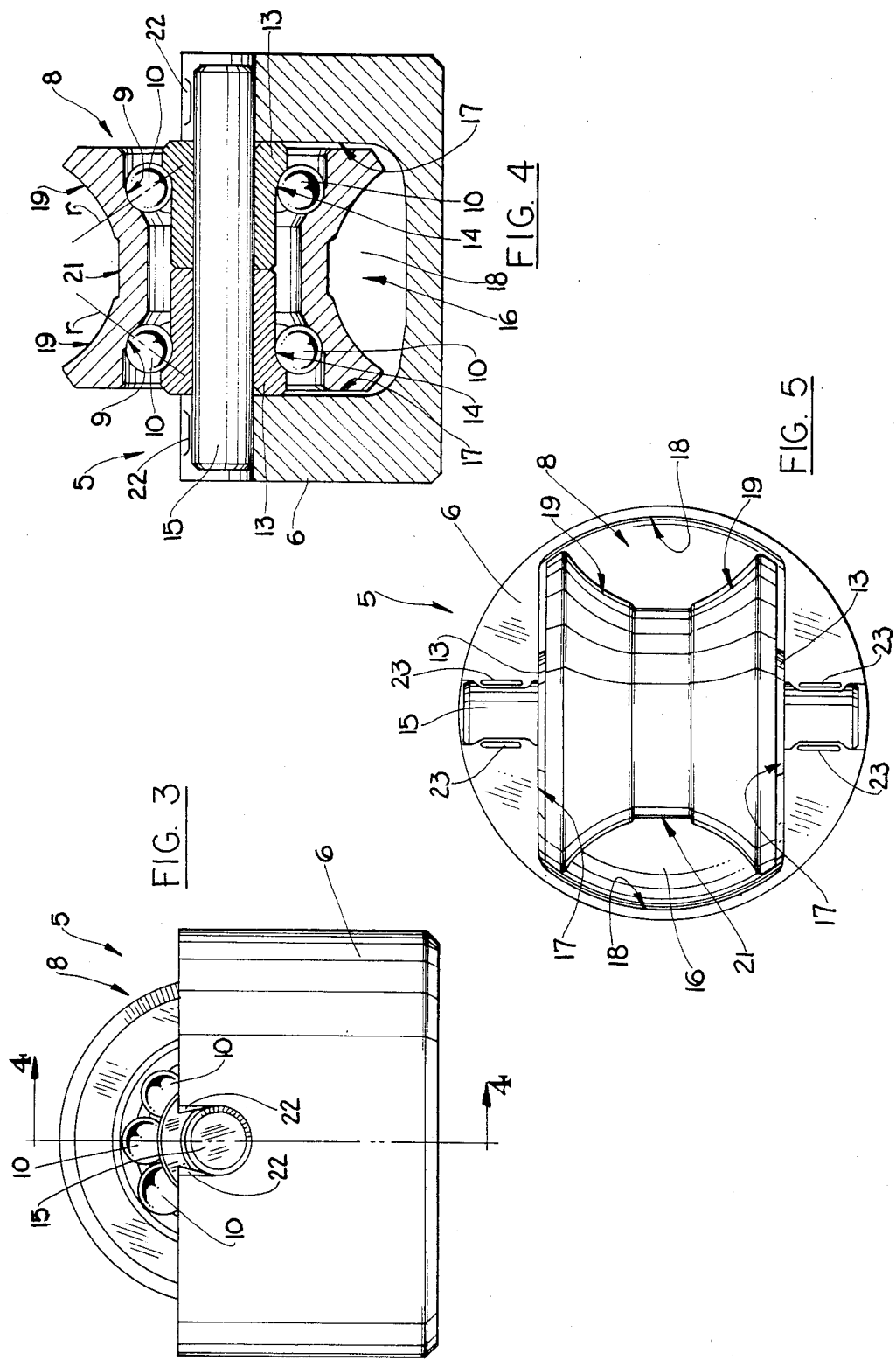

STEERING BOX FOR A MOTOR VEHICLE

BACKGROUND OF THE INVENTION

The present invention relates to a steering box for a motor vehicle, of the type comprising a rotatable toothed pinion and a rack meshing with the pinion and movable axially within a casing, by means of which it is possible to effect displacements of the rack itself with reduced friction, for the purpose of making the steering of the motor vehicle light and precise.

As is known, in steering boxes of the rack and pinion type, the toothed pinion receives the drive from the steering column while the rack controls the steering linkage to the wheels. The rack is usually supported at one end by a sliding bushing, and at the region where the pinion and the rack teeth mesh, by a sliding block provided with a normally cylindrical support surface which can couple with the corresponding surface of the rack opposite the teeth. The coupled surface carries the force which is transferred between the teeth of the pinion and the rack itself.

Steering boxes of this type have the disadvantage of requiring rather high forces on the steering wheel to effect steering, and in particular for movements of the vehicle from rest or in certain operating conditions. This is due to the high forces of rubbing friction which arises from the engagement between the said support surface and the corresponding contact surface of the rack, which forces oppose the axial displacement thereof.

It has also been proposed to support one end of the rack, instead of with a normal sliding bushing, with bushings of the recirculating ball type. The improvements which are obtained with the adoption of such constructional arrangements are very modest. Although the friction between the bushing and the rack is significantly reduced, the greater magnitude of friction between the sliding block and the rack remains unchanged. In this latter region, significant friction occurs because of the very high pressures which are transferred to the contacting surfaces of the rack and sliding block.

SUMMARY OF THE INVENTION

The object of the present invention is to provide a steering box of the type indicated hereinabove, in which the friction resisting axial displacement of the rack is very much reduced.

According to the present invention, there is provided a steering box for a motor vehicle comprising a rotatable toothed Pinion and a rack axially movable within a casing. The toothed pinion meshes with the rack and is disposed on one side thereof, while on the other side of the rack a support unit supports the thrust which the pinion applies to the rack during operation. The support unit comprises a rotatable roller operable to support the rack which is provided with an axial hole in which is formed a pair of tracks for rolling bodies, a pair of rings disposed within the hole in contact with one another on each of which is formed a rolling track for the rolling bodies, two rings of rolling bodies disposed between the tracks of the roller and the rings, a pivot pin for supporting the rings and a cylindrical body provided with a central cavity for at least partially receiving the roller, the cylindrical body being provided with a pair of slots each of which is able to receive one end of the pin.

BRIEF DESCRIPTION OF THE DRAWINGS

For a better understanding of the invention there is now given, by way of example, a detailed description with reference to the attached drawings, in which:

FIG. 2 is a section through the steering box of FIG. 1, taken on the line II—II of FIG. 1;

FIG. 3 is a side view of a support unit for the rack of the invention is provided;

FIG. 4 is a section through the support unit of FIG. 3 taken on the line IV—IV of FIG. 3;

FIG. 5 is a plan view of the support unit; and

FIG. 6 is a fragmentary enlarged view of a section of the rack position on the support unit.

DETAILED DESCRIPTION OF THE INVENTION

Figure 1:
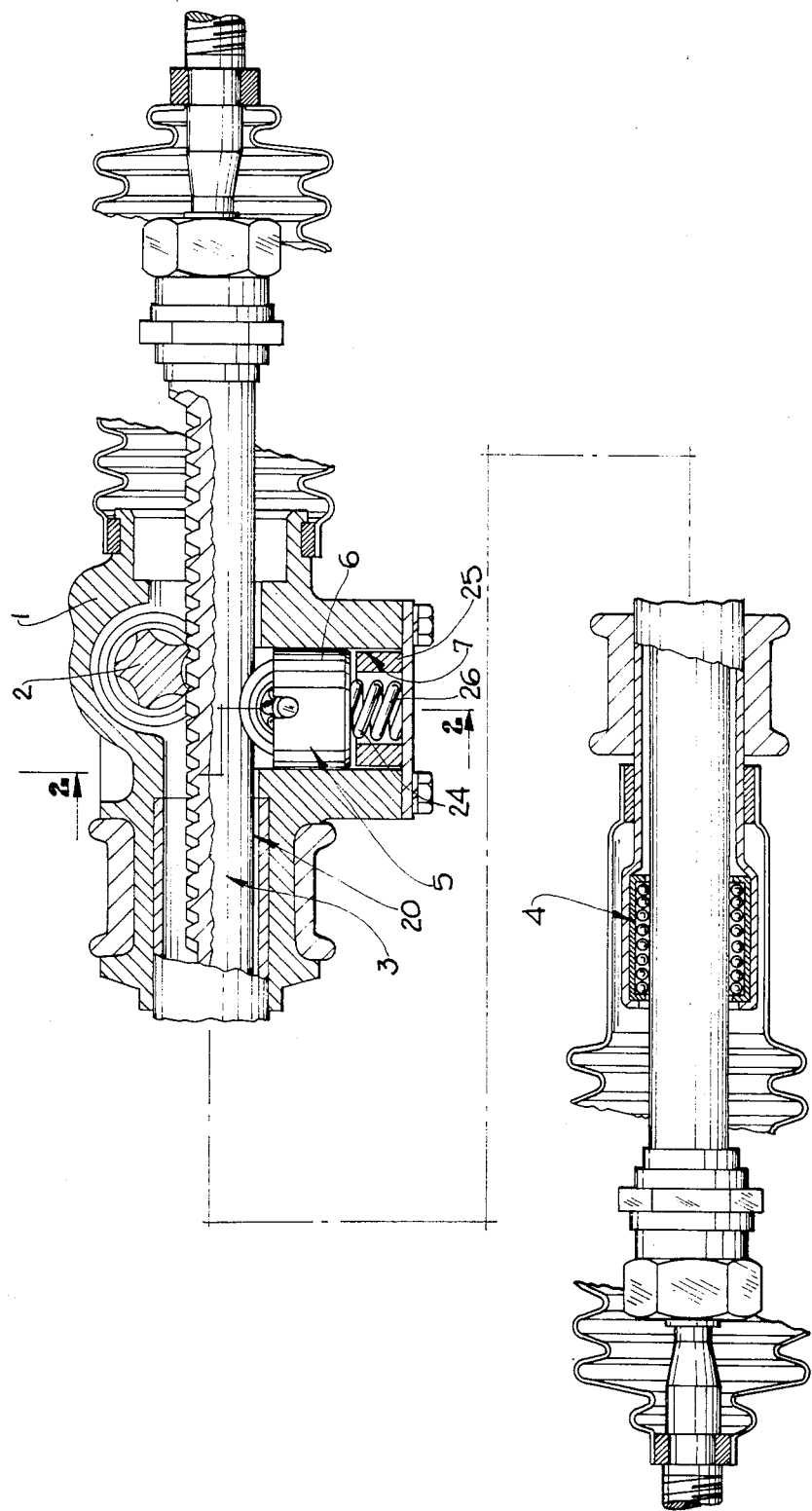
FIG. 1 is a fragmentary longitudinal section of the steering box constructed in accordance with the invention.

The steering box of the invention comprises a casing 1 in which a toothed pinion 2, is rotatably mounted along with a rack 3 which meshes with the pinion 2 and is axially movable within a casing. For longitudinal guidance of the rack there may conveniently be provided, at one or both ends of the said casing, a sliding bushing, or a recirculating ball bushing 4 as shown in FIG. 1. In accordance with the invention, there is disposed a support unit 5 which can substantially support the thrust which the pinion applies to the rack, the support unit being positioned against the rack opposite the pinion 2. The support unit comprises a cylindrical body 6 (FIG. 4) delimited by a substantially cylindrical surface which can be housed in a corresponding cylindrical surface 7 of the casing 1 (FIG. 1).

The unit comprises a roller 8 provided with a central hole in which are formed rolling tracks 9 for rolling bodies constituted by balls 10 in the case of the illustrated embodiment. This unit includes a pair of rings 13, each of which is provided with a rolling track 14 for the rolling bodies. The rings 13 which are mounted in contact with one another, are supported by a pin 15. The body 6 is provided with a cavity 16 which, as clearly seen in FIG. 5, is substantially delimited by a pair of flat opposite faces 17 and by a pair of cylindrical surfaces 18 to constitute a housing for the roller 8 and the other parts described above. On the upper part of the body 6 and in correspondence with each flat face 17 there is formed a slot 22 which can receive one end of the pin 15 as is clearly visible in FIG. 4.

Each of the rolling tracks 9 and 14 is formed in such a way that the contact between each ball 10 and the associated track takes place at points which are located on a pitch line r shown in FIG. 4. Each pitch line r is inclined by an angle different from 0° and preferably slightly different from 45°, to the equatorial plane of the roller 8. In this way the balls are able to transmit not only radial loads but also axial loads from the roller 8 to the internal rings 13.

The roller 8 is delimited externally by a pair of surfaces of revolution 19, each of which can be generated by a shape constituting substantially an arc of a circle; the radius of which is greater than that of the cylindrical surface 20 (FIG. 6) of the rack in contact therewith. The surfaces of revolution 19 are disposed with respect to the cylindrical surface 20 in such a way that, as is clearly seen in FIG. 6, the contact between the cylindrical surface 20 and each of the surfaces of revolution 19 takes place uniquely at the point P. Point P is located on a plane inclined with respect to the equatorial plane of the roller 8. The two surfaces of revolution 19 are separated by an annular groove 21.

The axial length of the rings 13 is slightly greater than the distance between the flat surfaces 17 which constitute a shoulder for the rings, in such a way that when these rings are mounted between the surfaces 17 there is a predetermined axial force between the rings 13 and the surfaces 17 for the purpose of preventing rotation of the rings 13 with respect to the pin 15.

The ends of the pin 15 are locked within the associated slot 22 by plastic deformation of the zones 23 (FIG. 5) of the body 6 which are located in immediate proximity to the slots. The plastic deformation can be effected in any convenient manner, for example, by forming small indentations on the upper surface of body 6, as is clearly visible in FIG. 5.

The steering box of the invention includes a resilient element, conveniently a helical spring 24 (FIG. 1), interposed between one wall 25 of the casing 1 and the body 6, for the purpose of pressing this latter towards the rack 3. Beneath the body 6 there is disposed a spacer 26, spaced from the body 6 a distance g to permit some free play and therefore limiting the downward displacement of the body 6.

The operation of the steering box is as follows. When the toothed pinion 2 is made to turn, this causes axial translation of the rack 3, during which it is guided by the bushing 4 (or by entirely equivalent sliding bearings). During the transmission of the movement from the pinion 2 to the rack 3, teeth of the pinion contact the teeth of the rack and the resulting forces have a first component in the direction of the axis of the rack (in this way determining the translation of it and the control of the steering linkage) and a second component in the direction orthogonal to the rack. The second component is supported by the support unit 5 which is able, because of its structure, to support very high forces. During translation of the rack 3, the roller 8 turns causing rotation of the balls 10 on the corresponding rolling tracks 9 and 14. The support unit 5 allows translation of the rack 3 with extremely low friction, with only rolling between the various parts of the unit taking place. Since the points of contact between each ball and the associated rolling track lie on the pitch lines r (FIG. 4), which, are inclined with respect to the equatorial plane of the roller 8, the supported rack is also able to support axial thrusts, which are transmitted to it during rotation of the pinion 2.

The frictional forces which occur during the translation of the rack 3 are also reduced substantially because of the type of contact between the cylindrical surface 20 (FIG. 6) of the rack and the surfaces of revolution 19 of the roller 8. In fact, between these surfaces the contact occurs solely at the two points P, each of which lies in a plane which is inclined with respect to the equatorial plane of the roller. Undesirable sliding between the contacting surfaces of the rack and the roller is entirely absent or very much reduced because of the reduced dimensions of the zones of contact. The symmetrical position of the points P with respect to the axis of the rack allows for correct support of the rack with respect to the roller 8.

The support unit 5 described is structurally very simple and therefore can be produced with significant precision and at low cost. In fact, the locking of the rings 13 to prevent their rotation during operation of the rack is simply obtained by forcing these between the surfaces 17 of the casing 1. The assembly and axial and rotational locking of the pin 15 with respect to the body 6 is also obtained in a very simple manner by means of the slots 22 and by the plastic deformation formed in the zones 23. The form of the body 6, within which the cavity 16 is completely enclosed, is able to impart to the body itself a significant rigidity. In particular, the body 6 prevents any relative displacement whatsoever of the slots 22 during the forcing of the rings 13 between the surfaces 17. Simultaneously, the casing 1 ensures a perfect axial guidance of the body 6 within the associated cylindrical hole formed in the casing 1.

It is apparent that the shape and disposition of the various parts of the steering box of the invention can be modified and varied without departing from the scope of the invention itself.

We claim:

1. In a rack and pinion steering box for a motor vehicle, comprising:
    a rotatable toothed pinion;
    a rack movable axially within the steering box, said rack being delimited by a cylindrical surface and having teeth disposed on a portion of said cylindrical surface; and
    a support unit positioned beneath said rack opposite said teeth to support the thrust which said pinion applies to said rack during operation, said support unit includes a rotatable roller for supporting said rack, said roller having an axial hole; a pair of rings disposed within said axial hole in contact with one another, each ring forming with said roller a rolling track; two rings of rolling bodies disposed in said rolling tracks; a pin for supporting said rings; and a cylindrical body having a central cavity for partially housing said roller, said cylindrical body also including a pair of opposed slots adjacent said central cavity for receiving each end of said pin; said rotatable roller being delimited by a pair of surfaces of revolution each of which is generated by an arc of a circumference, the radius of said circumference being greater than that of said cylindrical surface of said rack and said surfaces of revolution being disposed in such a way that the contact between said cylindrical surfaces and each of said surfaces of revolution occurs solely at a point which is located in a plane inclined with respect to the equatorial plane of said roller.

2. A steering box according to claim 1 wherein each of said rings has an outside end, said cavity of said cylindrial body includes a pair of shoulders for supporting said outside ends of said rings, the length of said rings being slightly greater than the distance between said shoulders in such a way that said rings can be mounted with axial force between said shoulders to prevent rotation thereof with respect to said pin.

3. A steering box according to claim 1 wherein said body is plastically deformed adjacent each of said slots to partially close said slots and lock each end of said pin within said slots.

4. A steering box according to claim 1 wherein said roller includes an annular groove, said two surfaces of revolution being separated by said annular groove.

5. A steering box according to claim 1 wherein each of said rings of said rolling bodies contact said roller and said pair of rings at points which lie in a straight line inclined at an angle different from 0° with respect to said equatorial plane of said roller.

6. A steering box according to claim 1, further including at least one resilient member between said body and said box to press said body toward said rack to insure constant contact.

* * * * *